United States Patent
Locher

[11] Patent Number: 5,950,505
[45] Date of Patent: Sep. 14, 1999

[54] PROCESS FOR STRIPPING AN INSULATED WIRE OR CABLE HAVING A CROSS-SECTION WHICH MAY BE NON-CIRCULAR AND STRIPPING DEVICE FOR CARRYING OUT THE PROCESS

[76] Inventor: Beat Locher, Bierigutstrasse 9, Thun, Switzerland, CH-3608

[21] Appl. No.: 08/753,348

[22] Filed: Nov. 25, 1996

Related U.S. Application Data

[63] Continuation-in-part of application No. PCT/IB95/00387, May 22, 1995, abandoned.

[30] Foreign Application Priority Data

May 24, 1994 [CH] Switzerland ............................ 1603/94

[51] Int. Cl.$^6$ .................................................... H02G 1/12
[52] U.S. Cl. ............................................. 81/9.51; 30/90.6
[58] Field of Search ....................... 81/9.4, 9.51; 30/90.4, 30/90.6, 90.7; 29/825, 426.1, 426.4

[56] References Cited

U.S. PATENT DOCUMENTS

| | | | |
|---|---|---|---|
| 2,235,575 | 3/1941 | Edwards | 30/90.6 |
| 3,091,031 | 5/1963 | Grant | 30/90.7 |
| 3,914,864 | 10/1975 | Prince | 30/90.6 |
| 3,946,487 | 3/1976 | Bieganski | 30/90.7 |
| 4,536,957 | 8/1985 | Britton | 30/90.4 |
| 4,543,717 | 10/1985 | Luka | 30/90.6 |
| 4,546,675 | 10/1985 | Okada et al. | 81/9.51 |
| 4,557,163 | 12/1985 | Tanner | 81/9.44 |
| 4,955,137 | 9/1990 | Matthews | 30/90.6 |
| 5,050,302 | 9/1991 | Mills | 30/90.4 |
| 5,085,114 | 2/1992 | DeRoss et al. | 30/90.6 |
| 5,142,950 | 9/1992 | Takano et al. | 81/9.51 |
| 5,487,200 | 1/1996 | Saitou | 30/90.6 |

*Primary Examiner*—David A. Scherbel
*Assistant Examiner*—Joni B. Danganan

[57] ABSTRACT

The invention relates to a stripping device for electric or optical cables or similar articles, having a centering holding apparatus and having at least two stripping blades (10), each of which is fastened to a blade arm (5), which arm (5) is rotatable about an axis of rotation (35), each arm (5) being linear and being linearly displaceable in the direction of a radial towards the axis of rotation (35) on a rotary ring (7), which is rotatably mounted with the arm (5). The possibility of linear displacement of the stripping blades (10) has the advantage that, regardless of the thickness of the material to be stripped, the blades (10) strike the outer sheath of the material to be stripped at the correct position. Cutting is therefore carried out without tilting, regardless of the thickness of the material to be cut. Further advantages arise from special embodiments.

29 Claims, 8 Drawing Sheets

Fig. 9a
Linear feed

Fig. 9b
Feed via pivotal point (Prior art)

5,950,505

PROCESS FOR STRIPPING AN INSULATED WIRE OR CABLE HAVING A CROSS-SECTION WHICH MAY BE NON-CIRCULAR AND STRIPPING DEVICE FOR CARRYING OUT THE PROCESS

This is a Continuation-In-Part of International Application PCT/IB 95/00387 with an international filing date of May 22, 1995, now abandoned.

BACKGROUND OF THE INVENTION

1. Field of the Invention

The invention relates to a process for stripping an insulated wire or cable (electric or optical) having a cross-section which may be non-circular, and a stripping device for carrying out the process.

2. Most closely related prior art

U.S. Pat. No. 4,543,717 of Tektronix Inc. describes a stripping device in which an axially acting—with respect to a cable to be stripped—and a radially acting stripping blade are each held on a swivel arm and can be swivelled independently of one another and in succession towards the cable inserted into the device. First the radially acting blade is swivelled into the insulation and this blade is then rotated around the cable, making a circumferential cut through the insulation. Thereafter, the radial blade is swivelled away from the cable and the axial blade is swivelled into the insulation. As a result of pulling out the cable—by hand—the insulation is then provided with a longitudinal cut. The axial blade is then swivelled back to its starting position. The circumferential cut and longitudinal cut permit removal of the piece of insulation. A device according to the teaching of the U.S. Patent is on the market under the name Maranatha Cable Stripper. The following problems arise in the case of these known devices:

With the same length setting, the arrangement of the blades on the swivel arm results in axially different contact points of the blades on the insulation as a function of the cable diameter, so that the accuracy of adjustment is low. To achieve a certain exact cut for a certain cable, it is therefore necessary as a rule to make several trial cuts in order to achieve the correct setting by trial and error. This is time-consuming and in particular disadvantageous if the stripping device is to be automated, since cumulative errors may occur under certain circumstances.

Swivelling of the blades also results in a different inclined position of the radial blade with respect to a radial plane through the cable once again as a function of the cable thickness. This leads under certain circumstances to cut surfaces which in fact also do not lie in a radial plane, which, when the cable is further processed with highly precise requirements, may be problematic or may lead to insulation defects.

In the case of thick insulation layers, there may therefore also be jamming at the lateral surfaces of the radial blade since the latter is moved along a cylinder lateral surface while cutting into the insulation and the resulting curved cut insulation surface rubs against the essentially straight lateral surface of the radial blade.

A further problem may be the adjustment of the radial blade with respect to the axial blade since, owing to the fact that the cut surfaces of these blades are perpendicular to one another, different initial points of attack on the outer sheath of the cable may also result in the case of different cable thicknesses. However, it must be ensured that the respective circumferential cuts intersect the respective axial cuts. This may give rise to additional adjustment work.

Another more recent stripping device for noncircular cable is described in U.S. Pat. No. 4,557,163 of Boeing. However, this device does not permit a clean circumferential cut. In addition, the device itself must be moved along the cable. It is thus of no help for solving the above problems.

Another stripping device with an earlier priority date is described in U.S. Pat. No. 4,546,675 of Tokyo Shibaura, the teaching of which is evidently the prior art for the most closely related U.S. Pat. No. 4,543,717 cited. This device was provided with radial and axial blades which are separated spatially and with regard to movement from one another in relation to the longitudinal axis of one cable and which furthermore were in the form of rotating cutter disks. This device thus permitted stripping of exclusively continuous cable since it was first necessary to make an axial cut for complete axial and radial incision, which is scarcely possible in the stripping of cable ends since in such a case it was necessary to push against the axial blade when inserting the cable into the device, which is not possible especially in the case of relatively thin cables. A combination of the positions of the two independent blades is not possible in this known design. Although this known device thus avoids the disadvantages of the cable diameter dependence and the inclined or curved cut surfaces, it cannot be used at all in a large number of processes for stripping cable end sections. Moreover, this device has large dimensions and requires separate, additional drives for the rotatable blades.

SUMMARY OF THE INVENTION

Object

The first object of the invention arises from these problems:

It is intended to provide a more precise process and a novel stripping device having two blades acting perpendicularly to one another, which permit greater precision, simpler and more accurate adjustment of stripping lengths and a low-friction cutting process by the radial blade.

This object is achieved in particular by a process for cutting into the insulation of an insulated wire or cable having a cross section that may be non-circular, comprising: a) rigidly holding a radial blade and an axial blade on blade holders; b) rotating the radial blade for a circumferential cut in insulation of the insulated wire or cable after penetration by the radial blade through a surface of the insulated wire or cable; c) in succession, guiding the radial blade for a circumferential cut and the axial blade for a longitudinal cut respectively in and along the insulation of the insulated wire or cable; d) feeding the radial blade along a perpendicular to the surface of the insulated wire or cable by a spring force during its feed towards the insulated wire or cable; e) affecting the feed of the radial blade and the axial blade by a control; f) positioning the radial blade and the axial blade approximately in a single plane, the plane being perpendicular to the direction of the insulated wire or cable and g) moving the radial blade and the axial blade independently of each other.

The possibility of feeding the blades radially with respect to the axis of rotation not only avoids the above-mentioned disadvantages but also has the advantage that, if required, blade feed is also possible by means of individual control drives whose feed action, monitored by sensors, can be accurate with regard to depth. In the conventional design, it was necessary to depend on adjusting rings or control cams, which however, in modified or similar form, can also be used together with the invention, as shown by the preferred example described below. Together with the possibility of linear feed, the independent adjustability of the blades with respect to the blade holders is advantageous since this results in universal handling of the apparatus for different insulation thicknesses.

An embodiment of the blade holder as a hollow body having a movable inner piston permits a compact design which as such is universally applicable optionally also depending on this stripping device. Thus, for example, the radial blade holder can be interchanged with the axial blade holder. The preferably provided spring loading on the piston leads to freedom from play, which avoids an undesired misadjustment on the spindle drive provided according to the invention.

The novel blade holder could, if required, be optimally motorized and equipped with remote control means, so that an automatic adjustment of the depth of penetration can be carried out.

If a guide mounted on ball bearings or roller bearings is provided on the parallel guide, this results in smaller adjustment forces and a rapid reaction to any feed or lift commands, which are preferably issued via a control roller which also has minimized friction and is present at that end of the blade arms which points away from the blade.

The further preferred arrangement having a common rotary ring and a central tube coupled therewith permits a compact design having a good possibility for balancing if a high speed is chosen for rotation of the blades. Moreover, the concept of the common rotary ring also makes it possible to arrange a plurality of blade holders—for example in a star shape—so that, if required, a plurality of circumferential cuts and/or a plurality of axial cuts can also be made simultaneously. The latter is advantageous in the case of insulations which are particularly difficult to strip.

Since in particular non-circular cables, for example multiconductor cables, cannot be truly centred, the variant with blade arms deflectable against spring force is preferred, each blade holder preferably being coordinated with an optionally adjustable pressure spring element against which the blade arms can be deflected as a result of eccentricity of the cable.

The wire or cable length to be stripped is set by means of a simple stop rod having a scale, preferably fastened to it, in the central tube, which rod can however also be dispensed with if a device according to the invention now also operates in combination with further, automatically controlled machines.

These may advantageously be arranged in series so that continuous cables can be processed. Conveying rollers which convey the cable or the wire into or out of the central tube and optionally simultaneously determine its length have proved advantageous in such inventive systems. To increase the processing precision, however, it is preferable to have a length measuring means which is independent of the conveying rollers and which makes, for example, marks on the cable and detects these again by means of a reader at an exactly defined distance from the marking device. Such an inventive further development made it possible to reduce inaccuracies of measurement.

The device is preferably equipped with a nonrotatable centring apparatus which is arranged before the blades and brings the wire or the cable into a good stripping position. The basic principle of the centring apparatus chosen originates from U.S. Pat. No. 5,010,797. All centring apparatuses described there can be readily used together with the stripping device according to the invention, that described subsequently, being preferred owing to its robustness.

A preferred embodiment is a device for cutting into continuous wires or continuous cables in which conveying rollers are provided adjacent to the central tube, which rollers grip a cable fed through the central tube in front of or behind the central tube and convey it to a cutting or winding device. This is advantageous within automatic processing of cables.

DESCRIPTION OF THE DRAWINGS

Further special embodiments and advantageous solutions are evident from the figures shown by way of example and the description thereof.

DERAILED DESCRIPTION OF PREFERRED EMBODIMENTS

The Figures are described in relation to one another, identical components being given identical reference symbols. Functionally similar components are given identical reference symbols with different indices. The introduction, the description of the figures and the claims form an information unit; pieces of information thus supplement one another. The stated reference symbols have in the main the following meaning and mode of action:

A housing 1 has a front and rear plate, a baseplate and a cover plate, in which a selector switch for different program modes is shown symbolically. Such program modes could be, for example: only rotational incision; rotational and longitudinal incision; only longitudinal incision; incision and centring with the centring jaws; incision and centring with centring sleeves which, for example, are held clamped by the centring jaws. It encloses and supports the device.

A cover 2 serves in particular for preventing access and is made of, for example, transparent plastic and can be removed from the housing 1 or can be pivotably fastened to the housing 1 by means of a hinge.

An insertion tube 3 serves for easier feeding of wires and cables and provides further protection against access.

A centring apparatus 4, as described above, could also be dispensed with or replaced by other centring apparatuses.

A blade arm 5a, acting radially, carries the radial blade unit 11a and cooperates with the control cam 31a; the form shown is expedient but not essential. A blade arm 5b, acting axially, carries the axial blade unit 11b and cooperates with the control cam 31b. A parallel guide 6a for blade arm 5a, has a linear carriage 20a that slides on it; this carriage may also be in the form of a maintenance-free standard element. A parallel guide 6b for blade arm 5b carries a linear carriage 20b.

Figure 1:
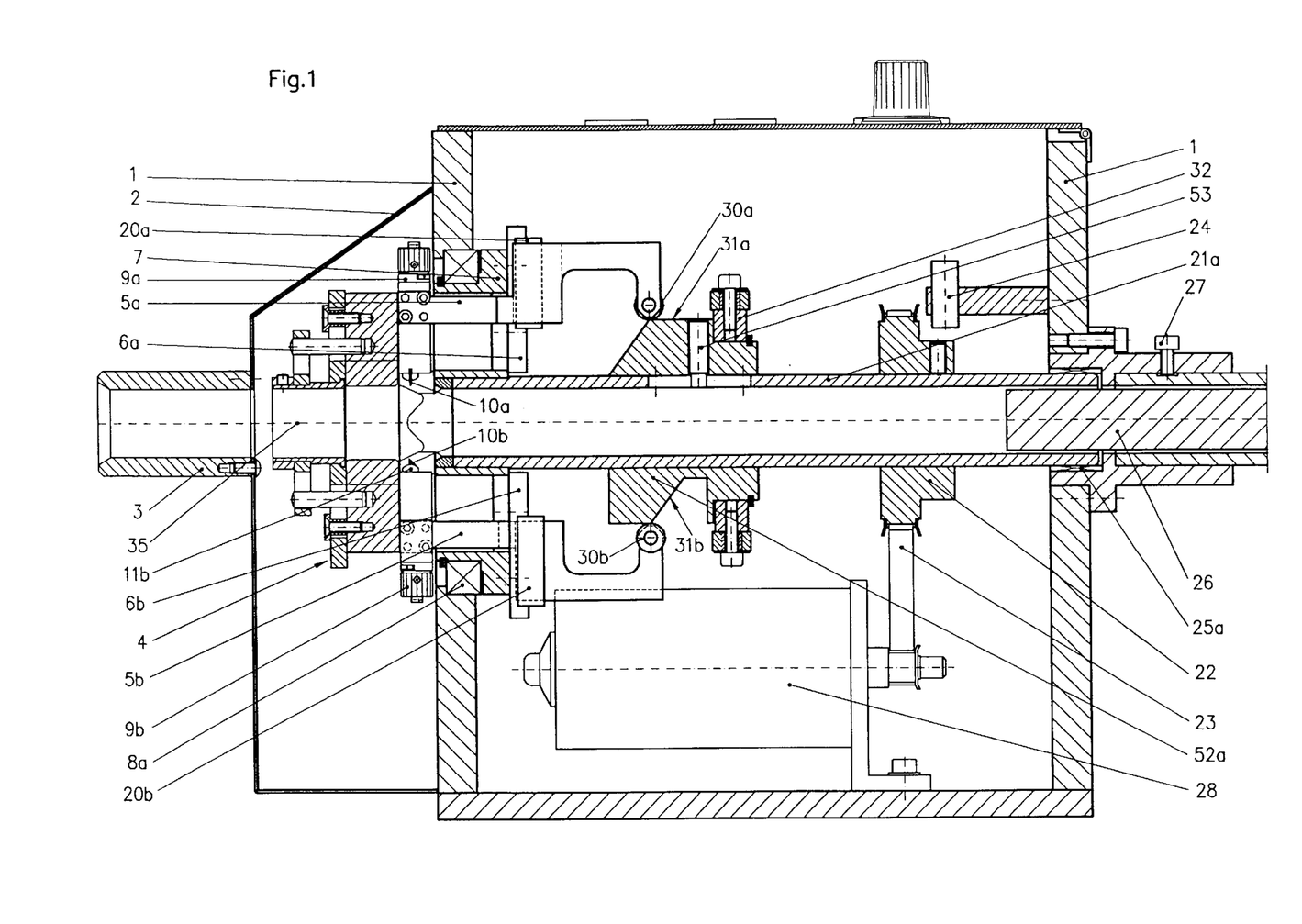
FIG. 1 shows a longitudinal section through an example, according to the invention, of a stripping device.

A rotating ring 7 carries the parallel guides 6a, 6b and is connected to the central tube 21a and mounted in the housing 1 by means of ball bearings 8a. Rotation of the central tube 21a via the toothed disc 22 thus leads to a rotation of the blade arms 5 about the axis of rotation 35. If the control cam 31a opens up the distance for the control roller 30a of the blade arm 5a during the revolution, said blade arm, together with its blade 10a, moves towards the wire or the cable in order to make the circumferential cut in its insulation. During this time, the control cam 31b blocks the blade arm 5b so that its axial blade 10b remains raised. When the control cam 31a is pushed back (on the left in FIG. 1), the control cam 31b opens up the distance for the blade arm 5b so that now the axial blade 10b reaches the cutting position. If the wire or the cable is now pulled out of the device again, the insulation is provided with a longitudinal cut.

Figure 7:
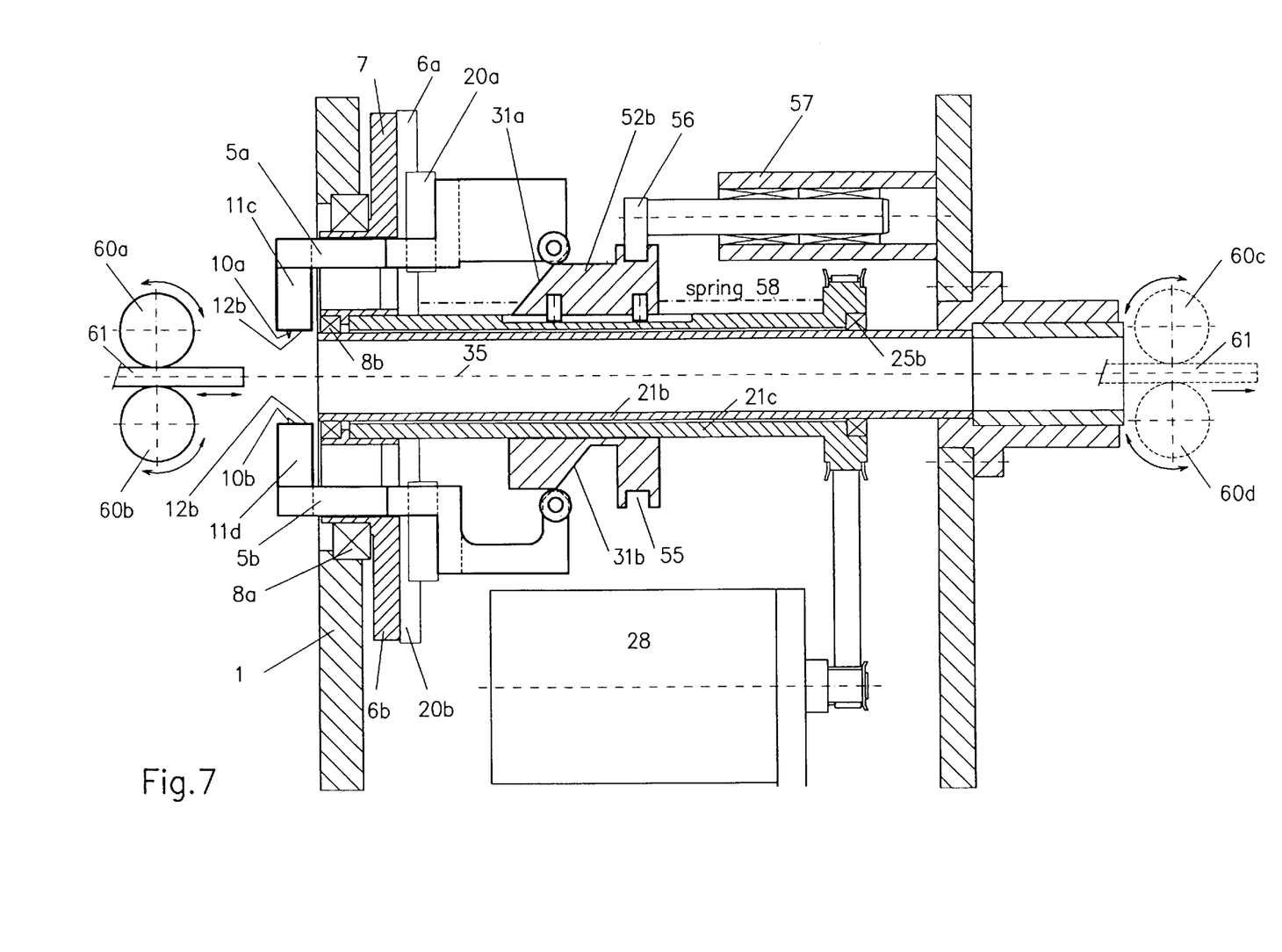
FIG. 7 shows a variant of the device according to FIG. 1 which is incorporated herein by reference.
Figure 8:
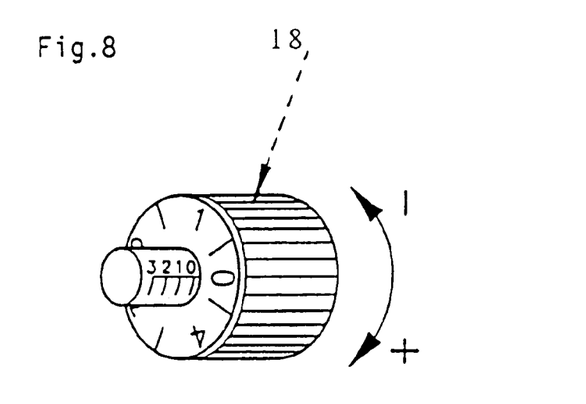
FIG. 8 shows an oblique view of a scale ring, the resolution of the scale being 0.5 mm, i.e. one revolution of the ring means a shift of the blade by means of 0.5 mm.

A blade adjustment device 9a is on blade unit 11a for radial blade 10a. A blade adjustment device 9b is on blade unit 11b for axial blade 10b. Blade units 11c, 11d according to variant in FIG. 7 are without particular adjustment facility for the blades 10a, b.

A shoulder 12a is supported on the outer surface of the insulation during cutting into the insulation and thus limits the cutting depth. The cutting depth can be varied in a controlled manner by means of the adjusting device 9a, b, which essentially has a drive 17 and a display 19. The shoulder 12a is preferably rounded, in particular spherical, since it can thus better follow the contour of the cable surface, in order to cause only little frictional resistance against the wire or cable. The mounting of the blade 10 itself is very simple: since, in contrast to the known blade, in this case the blade 10 itself has to be varied—changes in depth can be set on the blade holder 36—all that is necessary is to slacken fastening screws 13, after which the blade 10 can be removed from the orifice 37. A new blade is pushed into the orifice 37 as far as the stop on the blade holder 36 and the screws are screwed in again. A shoulder 12b is in the variant according to FIG. 7 and without rounding.

A pressure spring 14 clamps blade holder 36 against the housing of the blade unit 11 and takes up the play of the drive 17. A housing flange 15 is provided for spring 14. And a support projection 16 is provided for spring 14.

A thread on the blade holder 36 cooperates with a rotatable inner thread on the drive 17 which is rotatably mounted in the body of the blade unit 11. A part of the drive 17 projects from the body and is rotatably connected there to a scale ring 18a, b which in turn is supported on the body. The drive is thus positionally fixed; one rotation of the scale ring 18a, b results in an axial movement of the blade holder 36. This passes through the scale ring 18a, b and carries a depth display 19 on which the set cutting depth (projection of the blade above the shoulder 12a) can be read.

Scale ring 18a,b carries, on its upper end face, a scale which cooperates with an opposite scale on the upper end face of the blade holder 36, permitting fine adjustment to a hundredth of a millimetre without problems.

The guides 6a, b, carrying linear carrages 20a, b could also be of another form, for example in the form of a swallowtail support guide.

The central tube 21a is connected to the rotary ring 7 and mounted at the other end by means of bearing 25a in the housing 1. A rigid central tube 21b according to variant in FIG. 7, on which a rotatable central tube 21c is mounted by means of bearings 8b and 25b has the advantage that an inserted cable can by no means be twisted by friction in the tube 21a (FIG. 1) since tube 21b is rigid.

Conveying rollers (60a–60d) are provided adjacent to the central tube (21b, 21c), which rollers grip a cable (61) fed through the central tube (21b, 21c), in front of or behind the central tube (21b, 21c) and convey it to a cutting or winding device.

A toothed disc 22 is nonrotatably connected to tube 21a and transmits the drive power of a motor 28 or toothed belt 23 to the central tube. For the purposes of the invention, said tube could also be nonrotatable, in which case the toothed belt 23 should be coupled with the rotary ring 7 and the latter must be mounted opposite the central tube. The control cams 31 must then also be rotatably coupled with the rotary ring. For the purposes of the invention, an alternative variant, which is not shown, is obtained if the rotary ring is displaceable with the blade arms 5 and the control cams 31 relative to the housing 1 and parallel to the axis of rotation 35. Axial cuts could then also be made in the insulation without pulling out the cable manually. The drive belt 23, could also be replaced by gear wheels, or the like.

A position sensor 24 is optional and is provided only to permit detection of a certain rotary position of the rotary ring or of the blade 10 in the case of automatic operation. A second bearing 25a, for example sliding bearing is for central tube 21a.

A stop rod 26 for length adjustment of the cable, dispensed with for automated systems with continuous cable, could also be replaced by electronically drivable displacement transducer for automatic length adjustment. The stop rod is locked in its stop position by means of fixing screw 27.

A drive motor 28 could if required also be a stepping motor; the sensor 24 can then in any case be dispensed with. If only one axial blade lob is used and a plurality of axial cuts are desired, such a stepping motor would be advantageous for fixing the rotary ring 7 in different positions. Such multiple axial cuts would also be possible in a particularly simple manner by means of the above-mentioned displaceability of the rotary ring 7 or by the multiple arrangement of axial blades.

Figure 3:
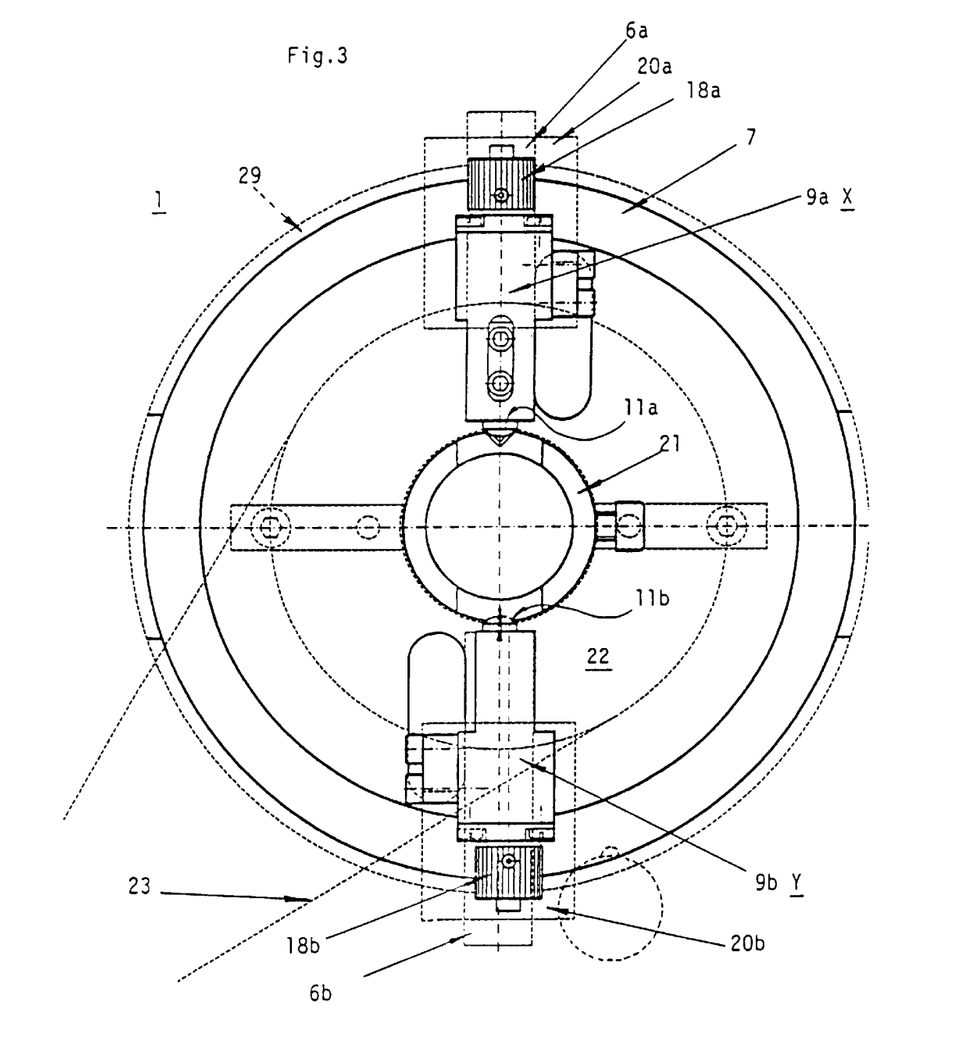
FIG. 3 shows a schematic view of the stripping blades and their holders from the direction of the cable to be introduced.

A hole 29 in the housing 1, holds the bearing 8a (FIG. 3).

Figure 2:
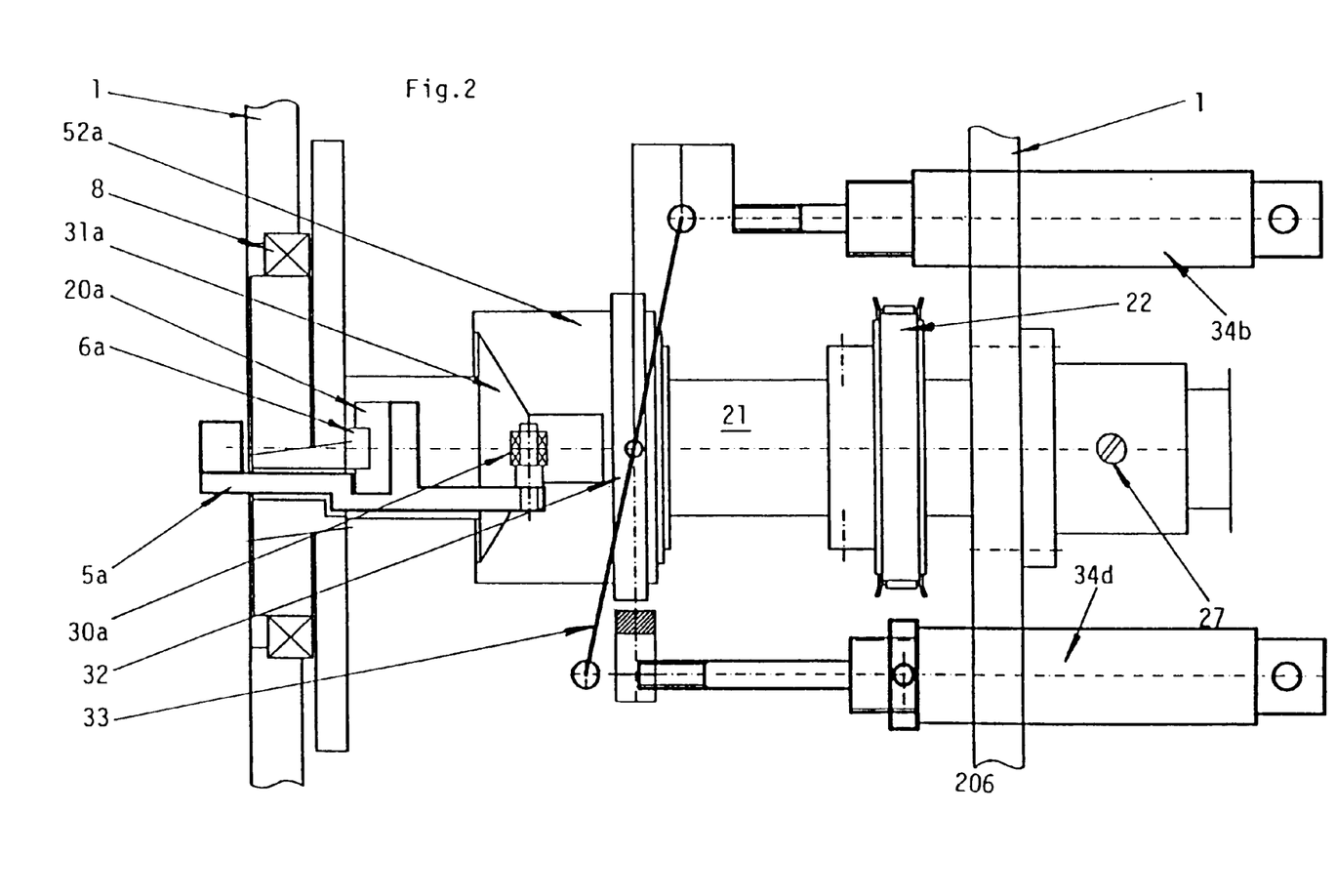
FIG. 2 shows a plan view of some components of the device according to FIG. shown schematically.

A control roller 30a,b, transmits the position of the control cam 31. Control cams 31a,b are formed, in the present example, on a block 52a which is longitudinally displaceable on the central tube 21a, but is nonrotatably held relative to said block by means of pin 53. The longitudinal displacement of the block is effected by a driver ring 32 and a control lever 33 is provided, which latter is actuated by at least one cylinder, in the present example by two cylinders 34a,b, as indicated symbolically in FIG. 2. Details of this actuation are familiar to a person skilled in the art or can, if required, be obtained from U.S. Pat. No. 4,543,717, FIG. 4 and associated description sections. To this extent, this document with its content is considered to have been described for the purposes of this application (i.e., incorporated herein by reference).

An axis of rotation 35 in the most favourable case (circular cable), is identical to the axis of an inserted cable. It is the axis of rotation of the bearings 8a and 25a.

Orifice 37 for blade 10, also acts as a lateral guide.

A baseplate 38 with grooves 60 is for centring apparatus 4.

A centring block 39 cooperates with the respective adjacent centring blocks 39a, c; the arrangement of four blocks also permits highly oval cables to be readily centered, since these are aligned along a diagonal in the square enclosed by the blocks 39a, c.

A hole 40 is in the baseplate 38 for passage of a wire or cable.

Thrust edges 41 on the blocks 39 slide against one another when the blocks are displaced radially with respect to the axis of rotation 35.

A roller guide 42a and pin guide 42b are supported, respectively, on and in corresponding grooves 54 of a control disc 43 which is actuated by a control piston 44 in the direction of rotation in order to displace the centring blocks 39. A control cylinder 45 is provided for control piston 44.

A piston sensor 46 on the control cylinder 45 senses the position of the control piston 44 in order to obtain information therefrom about the state of the centring blocks 39. Spring 47 serves as restoring force against the force of the control piston 44 and opens the centring jaws.

Figure 4:
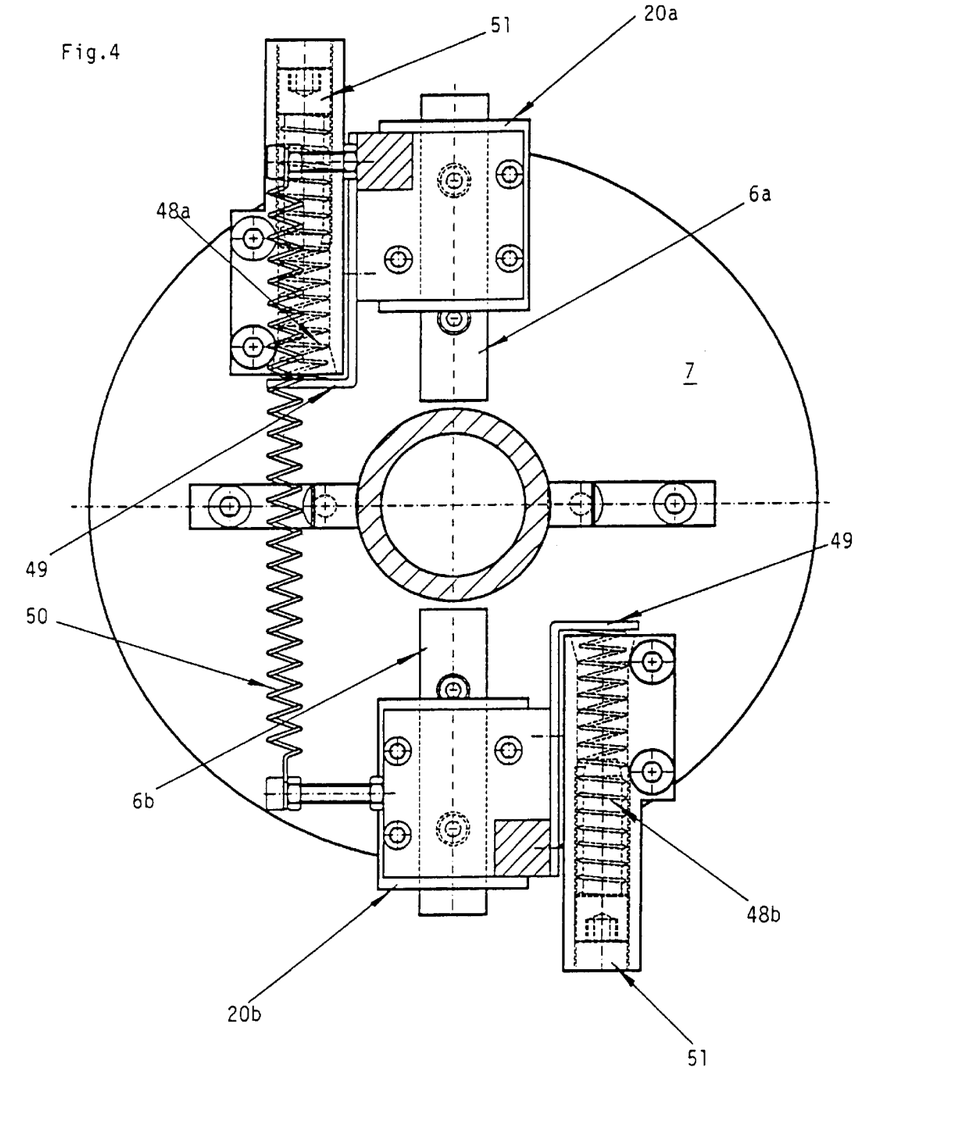
FIG. 4 shows a view according to FIG. 3 but from the opposite direction.
Figure 5:
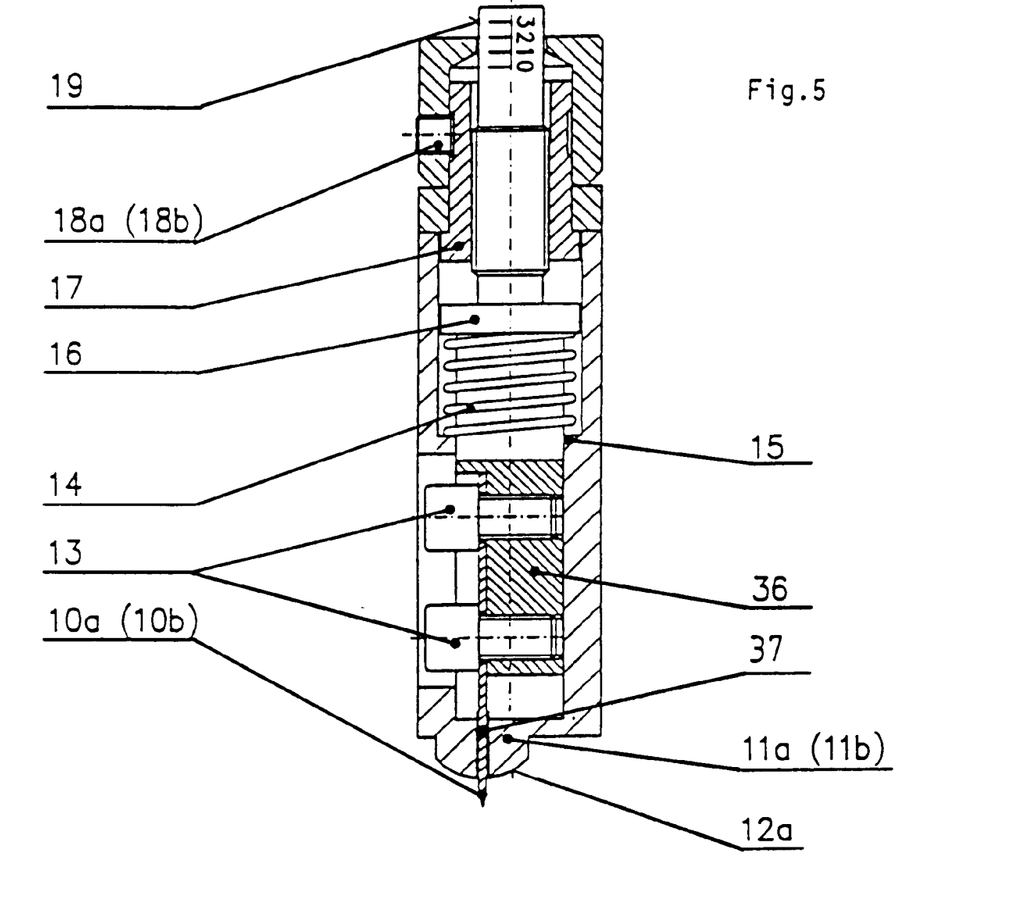
FIG. 5 shows a detail of the knife holders in section.
Figure 6:
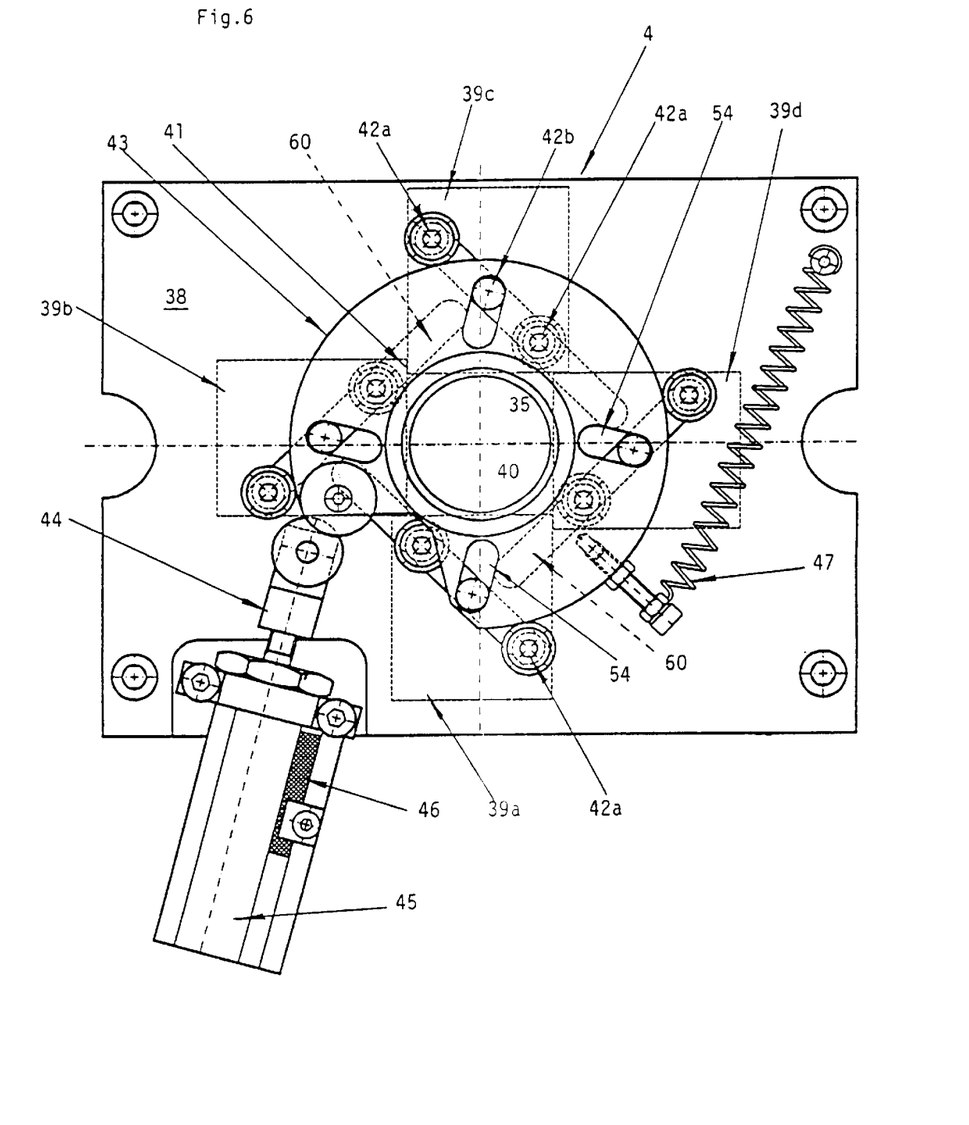
FIG. 6 shows a view of the preferably used centring apparatus, whose features and variants thereof are described, for example, in U.S. Pat. No. 5,010,797, the content of which is considered to be disclosed in connection with this application, where it relates specifically to the centring apparatus and which is incorporated herein by reference.

Pressure spring 48a,b presses, via an angle piece 49, each blade holder individually into its operating position if this is permitted by the position of the blade arms 5; cable eccentricities which force the blade 10 and the shoulder 12a outwards are absorbed by this spring 48 without another blade 10 lifting off from the cable sheath. This is also ensured mainly by the restoring spring 50 which pulls the two blade units towards one another in order in particular to compensate the centrifugal force (FIG. 4). owing to the easier maintenance, this advantageously replaces the O-ring, as described in the U.S. Patent cited first.

A spring force adjustment 51 is provided for the pressure springs 48, in order to comply with the material properties of the cables to be stripped.

A block 52a of the control cams 31a, b has a pin 42a.

An annular groove 55 in block 52b according to the variant in FIG. 7, has different actuation of the control cams 31a, b, in which a control member 56 engaging the groove 55 is displaced in the axial direction by a control drive 57 in order to position the control cams in the correct position. In this design, the block is held without play by two piston springs 58.

Figure 9A:
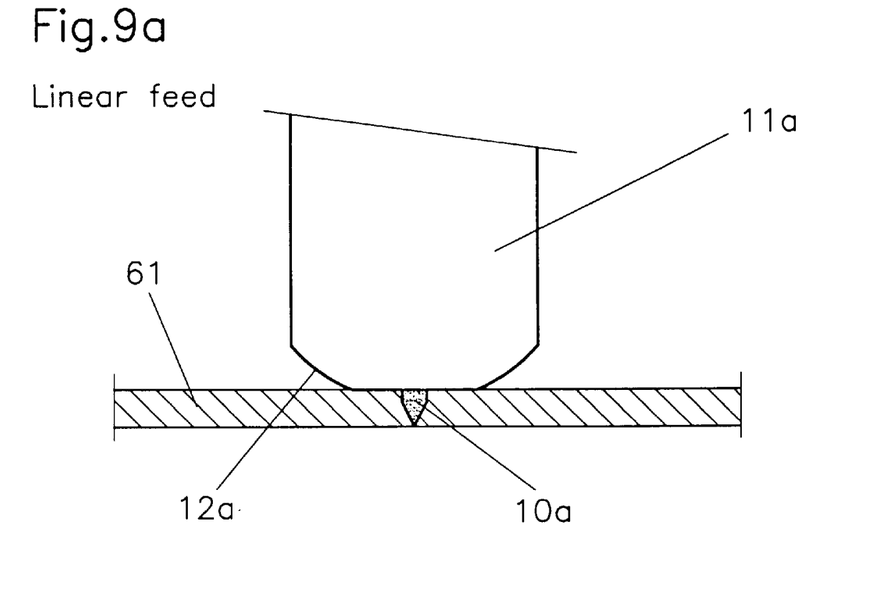
FIG. 9a illustrates a blade head fed perpendicular to the cable.
Figure 9B:
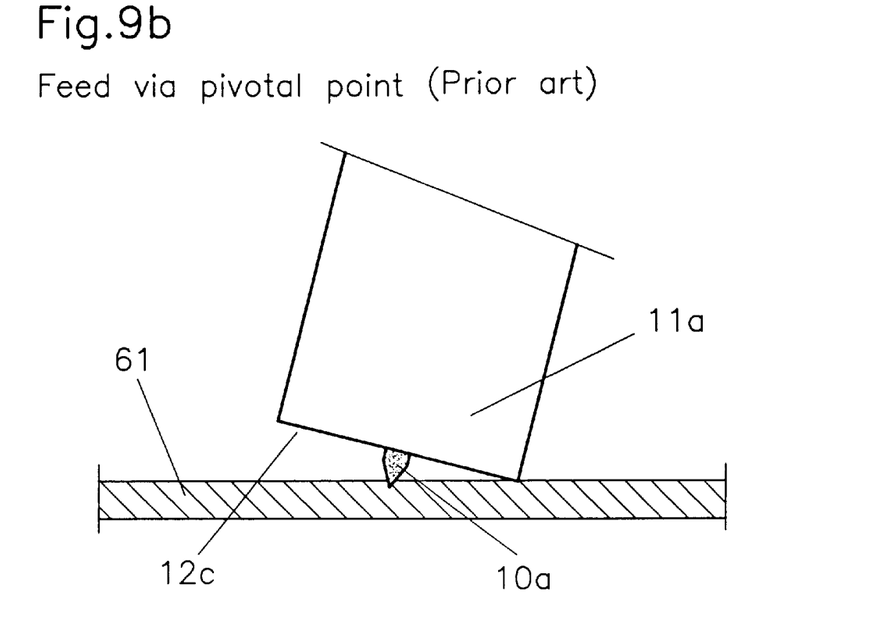
FIG. 9b illustrates the head of FIG. 9a fed via a pivotal point, according to the prior art.

A further advantage of the invention is evident 20 from the symbolic drawings of FIG. 9a, b. FIG. 9a shows a blade unit 11a according to the invention, the blade 10a of which cuts into a cable insulation 61. The shoulders 12a on both sides of the blade 10a rest against the lateral surface of the insulation 61. Particularly in the case of thin insulations, this has an advantageous effect on the quality of the cut. In contrast, FIG. 9b shows the prior art, where the corresponding shoulder 12c—depending on the cable diameter—is not parallel to the insulation surface.

I claim:

1. A device for stripping an insulated wire or cable, comprising:

at least one radial blade holder (11a) for a radial blade (10a), and at least one axial blade holder (11b) for an axial blade (10b), said axial blade holder is held on a first blade arm, said radial blade holder is held on a second arm (5a, 5b) that is rotatable about an axis of rotation (35) and actuatable in a direction towards said axis of rotation (35) in such a way that said radial blade (10a) and said axial blade (10b) are approximately in a single plane, said plane being perpendicular to the axis of said wire or cable, wherein said blade arm (5a, 5b) are each displaceably held on a parallel guide (6a, 6b), said parallel guides being at right angles to said common axis of rotation and arranged on a rotary ring (7) that is mounted in a housing rotatably about said axis of rotation (35).

2. Device according to claim 1, characterized in that at least the radial blade (10a), but preferably also the axial blade (10b), are adjustable relative to the respective blade holder (7a, b) so that it is possible to set the respective maximum possible cutting depth which is limited by a shoulder (12a) of the respective blade holder (11a, b).

3. Device according to claim 2, characterized in that at least the radial blade unit (11a) is in the form of a hollow body having a downward-pointing orifice (37) for the radial blade (10a), in which body is arranged a displaceable blade holder (36) which has, at its lower end, a fastening device (13) for the radial blade (10a) and which is connected at its upper end to a drive (17), which permits adjustable relative displacement between the blade holder (36) and the body.

4. Device according to claim 3, characterized in that the blade holder is spring-loaded against the body, the latter preferably having a housing flange (15) and the former a support projection (16), between which a pressure spring (14) which pretensions the drive (17) is arranged.

5. Device according to claim 3, characterized in that the drive (17) can be remote controlled by means of a motor and optionally has a displacement measuring member with a remote inquiry facility.

6. Device according to claim 1, characterized in that at least one of the blade arms (5a, b) is displaceably mounted on the associated parallel guide (6a, b) by means of a linear carriage (20a, b), which in particular has roller bearings or ball bearings.

7. Device according to claim 6, characterized in that at least one linear carriage (20a, b) is displaceable by means of a remote controllable motor relative to the respective parallel guide (6a, b), and that a measuring apparatus having remote inquiry facilities is preferably arranged on the parallel guide (6a, b).

8. Device according to claim 1, characterized in that at least one of the blade arms (5a, b) has, at its end facing away from the blade (10a, b), a control roller (30a, b) which cooperates with a control cam (31a, b) rotatable together with the rotary ring (7).

9. Device according to claim 1, characterized in that the rotary ring (7) is coupled with a central tube (21a) which is rotatably mounted at its other end in the housing (1) and carries a displaceable control cam (31a, b).

10. Device according to claim 9, characterized in that the central tube (21a) has a stop rod (26), having a scale for length adjustment of the wires or cables to be stripped.

11. Device according to claim 10 characterized in that the stop rod (26) is motor-adjustable.

12. Device according to claim 1, characterized in that a pressure spring (48a, b) is coordinated with at least one of the blade arms (5a, b) so that said blade arm can be radially deflected relative to the axis of rotation (35) against spring force, the spring force being adjustable.

13. Device especially according claim 1, having a non-rotatable centring apparatus (4) which faces the wire or cable to be inserted, characterized by the following structure:

a baseplate (38) having a hole (40) concentric with the axis of rotation (35) is rigidly connected to the housing (1);

at least three centring blocks (39) are provided on the baseplate (38), two of which centring blocks have thrust edges (41) which touch one another;

the centring blocks (39) have a roller guide or pin guide comprising two pins (42a) which slide in grooves (60) in the baseplate (38) and one pin (42b) which additionally slides in a groove (54) in the control disc (43), rotation of the control disc causing the pin 42b to be driven in the direction of the axis of rotation (35), which results in radial displacement of the centring blocks relative to the axis of rotation (35);

the control disc (43) is actuated in the direction of rotation by a control piston (44), in particular one which can be remote controlled, which piston is preferably equipped with a position sensor (46) having remote inquiry facilities;

a spring (47) stretched between the control disc (43) and the baseplate (38) ensures restoration of the control disc (43) and hence of the centring blocks (39) against the control piston (44).

14. Device according to claim 13, characterized in that the centring apparatus consists of interchangeable, centring sleeves which are lockable on the housing (1), between centring jaws.

15. Device for cutting into continuous wires or continuous cables with a device according to claim 1, characterized in that conveying rollers are provided adjacent a central tube, which rollers grip a cable fed through the central tube in front of the central tube.

16. Device according to claim 15, characterized in that a marking and reading apparatus is arranged for determining the length of the wire or cable moved through the rollers.

17. Device according to claim 1, characterized in that the blade holders are spherically rounded on their side which exposes the blade.

18. Device according to claim 1, characterized in that a pressure spring (48a, b) is coordinated with at least one of the blade arms (5a, b) so that said blade arm can be radially deflected relative to the axis of rotation (35) against spring force, the spring force being adjustable and provided with shock absorption.

19. Device for cutting into continuous wires or continuous cables with a device according to claim 1, characterized in that conveying rollers are provided adjacent the central tube, which rollers grip a cable fed through the central tube behind the central tube and convey it to a cutting device.

20. Device for cutting into continuous wires or continuous cables with a device according to claim 19, characterized in that the further apparatus is a cutting device.

21. Device for cutting into continuous wires or continuous cables with a device according to claim 19, characterized in that the further apparatus is a winding device.

22. A process for cutting into the insulation of an insulated wire or cable having a cross section that may be non-circular, comprising:

a) rigidly holding a radial blade (10a) in a blade holder (11a);

b) rotating said radial blade (10a) in insulation of said insulated wire or cable after penetration by said radial blade (10a) through a surface of said wire of cable to form a circumferential cut;

c) feeding said radial blade (10a) along a perpendicular to said surface of said insulated wire or cable by a spring force during feed of said radial blade (10a) towards said wire or cable; and d) affecting said feed of said radial blade (10a) by a control.

23. The process according to claim 22, wherein said spring force that feeds said radial blade is adjustable independently of a spring force which feeds an axial blade.

24. A process for cutting into the insulation of an insulated wire or cable having a cross section that may be non-circular, comprising:

a) rigidly holding an axial blade (10b) on a blade holder (11b);

b) longitudinally cutting insulation of said insulated wire or cable with said axial blade (10b);

c) feeding said axial blade (10b) along a perpendicular to a surface of said insulated wire or cable by a spring force during feed of said axial blade (10b) towards said insulated wire or cable; and d) affecting said feed of said axial blade (10b) by a control.

25. The process according to claims 24, wherein said spring force that feeds said axial blade is adjustable independently of a spring force which feeds a radial blade.

26. A process for cutting into the insulation of an insulated wire or cable having a cross section that may be non-circular, comprising:

a) rigidly holding a radial blade (10a) and an axial blade (10b) on blade holders (11a, 11b);

b) rotating said radial blade (10a) for a circumferential cut in insulation of said insulated wire or cable after penetration by said radial blade (10a) through a surface of said insulated wire or cable;

c) in succession, guiding said radial blade (10a) for a circumferential cut and said axial blade (10b) for a longitudinal cut respectively in and along said insulation of said insulated wire or cable;

d) feeding said radial blade (10a) along a perpendicular to said surface of said insulated wire or cable by a spring force during its feed towards said insulated wire or cable;

e) affecting said feed of said radial blade (10a) and said axial blade (10b) by a control;

f) positioning said radial blade and said axial blade approximately in a single plane, said plane being perpendicular to the direction of said insulated wire or cable, and g) moving the radial blade (10a) and the axial blade (10b) independently of each other.

27. Process according to claim 26, characterized in that the axial blade (10b), too, is fed along a perpendicular to the wire or cable surface during its feed towards the wire or cable, the blade positions being chosen so that the plane which passes through the respective perpendicular and in which the respective cut in the cable or write insulation is also present is at right angles to the corresponding plane through the other perpendicular.

28. The process according to claim 26, wherein said spring force that spring loads said radial blade is adjustable independently of spring force that spring loads said axial blade.

29. The process according to any one of claims 22, 24 or 27, wherein said control is affected by longitudinal displacement of a control block (52) provided with control cams.

* * * * *